(12) United States Patent
Elyashiv et al.

(10) Patent No.: US 9,277,015 B1
(45) Date of Patent: Mar. 1, 2016

(54) COMMUNICATION SEQUENCES BASED ON USER RULES

(71) Applicant: Yallo Technologies (Israel) Ltd., Tel-Aviv (IL)

(72) Inventors: Tal Elyashiv, Ramat-HaSharon (IL); Yoseph Taguri, Tel-Aviv (IL); Shmuel Ur, Shorashim (IL)

(73) Assignee: Yallo Technologies (Israel) Ltd., Tel-Aviv (IL)

( * ) Notice: Subject to any disclaimer, the term of this patent is extended or adjusted under 35 U.S.C. 154(b) by 0 days.

(21) Appl. No.: 14/698,919

(22) Filed: Apr. 29, 2015

(51) Int. Cl.
*G06F 15/16* (2006.01)
*H04L 29/08* (2006.01)

(52) U.S. Cl.
CPC .............. *H04L 67/141* (2013.01); *H04L 67/16* (2013.01)

(58) Field of Classification Search
None
See application file for complete search history.

(56) References Cited

U.S. PATENT DOCUMENTS

| | | |
|---|---|---|
| 5,467,388 A | 11/1995 | Redd, Jr. et al. |
| 5,566,236 A | 10/1996 | McLampy et al. |
| 6,198,916 B1 | 3/2001 | Martin et al. |
| 7,233,788 B2 | 6/2007 | Kedem |
| 7,818,003 B2 | 10/2010 | Callaghan |
| 8,068,824 B2 | 11/2011 | Shan et al. |
| 8,831,591 B2 | 9/2014 | Kotecha et al. |
| 8,897,786 B2 | 11/2014 | Ryu et al. |
| 8,942,685 B2 | 1/2015 | Weksler et al. |
| 2002/0161604 A1* | 10/2002 | Kardos et al. ..................... 705/1 |
| 2010/0150332 A1 | 6/2010 | Soo et al. |

FOREIGN PATENT DOCUMENTS

| | | |
|---|---|---|
| CN | 101426185 | 5/2009 |
| CN | 102055832 | 5/2011 |
| WO | WO 98/57480 | 12/1998 |
| WO | WO 2013/181921 | 12/2013 |

OTHER PUBLICATIONS

Droidural "Polite Call Reject, V1.1", SlideMe LLC, 3 P., Mar. 11, 2012.
Tacoty "Call Block [Block Call or SMS]—Android Apps on Google Play", Tacoty App, Google, 3 P., Jul. 8, 2015.
Zukerman "A Better Way to Block Unwanted Calls on Your Android Phone", Makeuseof, 4 P., Jun. 14, 2012.

\* cited by examiner

*Primary Examiner* — Brian P Whipple

(57) ABSTRACT

There is provided a method for establishing a communication session between a client device of a caller and a client device of a callee, comprising: iteratively attempting to establish a communication session, via a communication interface of a client device of a caller, to a communication address of a client device of one of a plurality of callees represented as contact members stored in an electronic address-book, wherein each respective iterative attempt includes; detecting failure of the establishment of the communication session; applying a set-of-rules associated with the respective contact member and stored in a set-of-rules repository, to attempt to establish a subsequent communication session via the communication interface; and attempting to establishing further communication sessions defined by a sequence of the set-of-rules when previous attempts at establishing communication sessions have failed; wherein each respective communication session allows human language based communication between the caller and the callee.

30 Claims, 9 Drawing Sheets

| Attempt # | Contact Name | Description | Communication address | Details of application | Delay before attempting |
|---|---|---|---|---|---|
| 1 | John Smith (Friend) | Mobile Number | 1234567 | Wait 8 rings | |
| 2 | John Smith | Work Number | 7654321 | Wait 3 rings | 10 minutes |
| 3 | John Smith | Home Number | 9999999 | Wait 5 rings | 0 minutes |
| 4 | John Smith | Email | John.smith@email.com | Text of email "please call me back" | 5 minutes |
| 5 | | | | Repeat sequence | 1 hour |

FIG. 4A

| Attempt # | Contact Name | Description | Communication address |
|---|---|---|---|
| 1 | Wife | Mobile Number | 1111111 |
| 2 | Son | Mobile Number | 2222222 |
| 3 | Daughter | Mobile Number | 3333333 |
| 4 | | My home number | 4444444 |

FIG. 4B

| Attempt # | Contact Name | Description | Communication address |
|---|---|---|---|
| 1 | worker 1 | Mobile Number | 88888888 |
| 2 | worker 2; worker 3; worker 4 | Mobile Numbers | 5555555; 6666666; 7777777; |

FIG. 4C

| Attempt # | Contact Name | Description | Communication address | Details |
|---|---|---|---|---|
| 1 | Mother | Mobile Number | 1212121 | |
| 2 | Friend1; friend 2; friend 3 | Mobile Number for text messages; Email; text | 2323232; 3434343 myfriend@friend.com | Send messages "Going to have a baby!" |

FIG. 4D

| Attempt # | Contact Name | Description | Communication address | Details |
|---|---|---|---|---|
| 1 | Front desk reception | Landline | 8989898 | Call when time of day is between 9 AM and 5 PM |
| 2 | Security desk | Landline | 7979797 | Call when time of day is between 5 PM and 9 AM |
| 3 | Security guard | Mobile phone | 5959595 | Call when time of day is between 5 PM and 9 AM |

FIG. 4E

| Attempt # | Contact Name | Description | Communication address | Details |
|---|---|---|---|---|
| 1 | Friend 1; Friend 2; Friend 3; Friend 4. | Home Numbers | 1919191 2929292 3939393 4949494 | Home addresses: 123 Sesame Street 59 Pine Avenue 8787 Lake Court 4398 Mountain Road<br><br>Call friend in closest geographical proximity |
|  |  |  |  | Repeat sequence for next friend in increasing geographical distance |

FIG. 4F

| Attempt # | Contact Name | Description | Communication address | Details |
|---|---|---|---|---|
| 1 | Associate 1 | Instant Message | FREDDY1975 | Wait 5 minutes to receive response or read notification |
| 2 | Associate 2 | Instant Message | JACKSMITH4 | Wait 10 minutes to receive response or read notification |
| 3 | External Consultant1; External Consultant2; External Consultant3 | Instant Message | CONSULTANCY; QUALITYSERVICE; OUTSOURCING; | Invite all to group chat |

FIG. 4G

| Attempt # | Contact Name | Description | Communication address | Details |
|---|---|---|---|---|
| 1 | Mother | Mobile Number | 5858585 | If busy then go to next attempt, else connect caller |
| 2 | Father | Mobile Number | 4343433 | If busy or on other line then go to next attempt, else connect caller |
| 3 | Daughter | Mobile Number | 7474744 | If busy or on other line or voicemail then go to next attempt, else connect caller |
| 4 | Family home | Landline | 8282822 | If busy, then notify user |

COMMUNICATION SEQUENCES BASED ON USER RULES

BACKGROUND

The present invention, in some embodiments thereof, relates to communication session management and, more specifically, but not exclusively, to systems and methods for communication session management based on user rules.

A caller may attempt to establish a communication session with a callee using one of many available communication media, to one of many possible communication addresses. For example, a phone call may be made to a cellular phone, a landline at home, and a central number at a workplace. An email may be sent to a personal email address, or to a work email address. A text message may be sent to a mobile phone, or to a desktop application. Adding to the complexity of choices, are client devices, such as Smartphones, that have the capability to provide all of the communication media. Systems and methods are being developed to help users organized and better use the multiple available ways to communicate with each other.

SUMMARY

According to an aspect of some embodiments of the present invention there is provided a method for establishing a communication session between a client device of a caller and a client device of a callee, comprising: iteratively attempting to establish a communication session, via a communication interface of a client device of a caller, to a communication address of a client device of one of a plurality of callees represented as contact members stored in an electronic address-book, wherein each respective iterative attempt includes; detecting failure of the establishment of the communication session; applying a set-of-rules associated with the respective contact member and stored in a set-of-rules repository, to attempt to establish a subsequent communication session via the communication interface; and attempting to establishing further communication sessions defined by a sequence of the set-of-rules when previous attempts at establishing communication sessions have failed; wherein each respective communication session allows human language based communication between the caller and the callee.

Optionally, the method further comprises transmitting the set-of-rules from the client device of the caller to a server external to the client device of the caller and the client devices of the plurality of callees; and wherein the iteratively attempting is performed by the server. Optionally, the method further comprises identifying, at the client device of the caller, the respective contact member according to a manual user to input, wherein the set-of-rules is mapped to the respective contact member at the client device. Alternatively or additionally, the server attempts to establish the communication session as a voice over internet protocol (VoIP) phone call.

Optionally, detecting failure comprises a failure to acquire a real time human response.

Optionally, the set-of-rules dynamically define the callee for the subsequent attempt at establishment of the communication session based on at least one of a fact acquired by code and senor input data. Optionally, the set-of-rules dynamically define the callee based on at least one member from the group consisting of: time of day, geographic location of the caller, geographic location of the callee, topic of discussion, frequency of earlier communication sessions between the caller and the callee, and previous communication sessions initiated from the callee.

Optionally, the set-of-rules define additional communication addresses of the same respective contact for subsequent communication session establishment attempts.

Optionally, the set-of-rules associated with the respective contact member define different communication addresses of other contact members different than the respective contact member for subsequent communication session establishment attempts.

Optionally, the method further comprises repeating the sequence from a beginning when a last of the communication session establishment attempts has failed.

Optionally, a last entry in the sequence defines an electronic message for transmission to the client device of the contact member using an electronic message address stored in associated with the contact member in the electronic address-book.

Optionally, the method further comprises terminating the iteratively attempting to establish further communication sessions and establishing a communication session with a simultaneous incoming communication session attempt, when the simultaneous incoming communication session attempt is detected as originating from at least one of an originating contact member and an originating communicating address defined within the set-of-rules being applied.

Optionally, the method further comprises continuing the iteratively attempting until a human communication is established with any of the previous callees.

Optionally, the method further comprises automatically analyzing the attempted sequence, and automatically adapting to set-of-rules according to the analysis to attempt to reduce the number of future failed attempts.

According to an aspect of some embodiments of the present invention there is provided a server for establishing communication sessions each between a caller client device and a callee client device, comprising: a first communication interface for communicating with a plurality of caller client devices; a second communication interface for establishing a communication session with each of a plurality of callee client devices; a program store storing code; a processor coupled to the first communication interface, the second communication interface, and the program store for implementing the stored code, the code comprising: code to receive from each of the plurality of caller client devices, a electronic message including a set-of-rules associated with a callee, the set of-rules defining a sequence of at least one iterative attempts at establishing a communication session; code to iteratively apply the set-of-rules to iteratively attempt to establish a subsequent communication session when an attempt to establish a communication session via the second communication interface using a communication address of a callee client device of one of the plurality of the callees fails, wherein each respective iterative attempt includes attempting to establishing further communication sessions defined by the sequence when previous attempts at establishing communication sessions have failed; and code to route the established communication session via the first communication session to the respective caller client device, to allow communication between the caller client device and the callee client device; wherein each respective communication session allows human language based communication between the caller and the callee.

Optionally, computing resources of each respective caller client device are freed up for other uses when the server receives the electronic message from the respective caller client device.

Optionally, the sequence of at least one subsequent attempt includes at least one second communication address of the respective callee client device or a second callee, and the code applies the set-of-rules to attempt to establish the subsequent communication session to the at least one second communication address of the to respective callee client device or the second callee.

Optionally, the first communication session is a voice over internet protocol (VoIP) phone call, and first communication address is a phone number.

Optionally, the communication session is established when the code identifies a ring tone, and the communication session fails when the code identifies a member of the group consisting of: a busy signal, a signal representing the callee being on another line, a signal representing the callee device is off, a signal representing the callee device is unavailable, and a signal representing a forward to voicemail.

Optionally, the subsequent communication session is an electronic messaging session, and the second communication address is an electronic messaging address.

Optionally, the code store includes code to automatically generate the set-of-rules by analyzing at least one of social relations from a social network, a family tree, and patterns in a history of actually dialed numbers.

Optionally, the sequence of at least one subsequent attempt includes a plurality of second communication addresses of a plurality of second contact members, and the code applies the set-of-rules to simultaneously attempt a single subsequent communication session including the plurality of second contact members via the plurality of second communication addresses.

Optionally, the server further comprises a set-of-rules repository storing a plurality of second sets-of-rules each associated with a communication address of a callee client device, wherein the code executes the respective second set-of-rules corresponding to respective communication addresses of the respective callee client device defined by the set-of-rules within the electronic message.

According to an aspect of some embodiments of the present invention there is provided a client device of a caller for establishing a communication session with a callee client device, comprising: a communication interface for establishing at least one communication session with at least one client device of at least one callee; an electronic address-book storing a plurality of contact members with at least one related communication address for establishment of the at least one communication session; a set-of-rules repository storing, for at least one of the plurality of contact members, at least one set of-rules defining a sequence of at least one subsequent attempts at establishing a communication session; a program store storing code; a to processor coupled to the communication interface, the electronic address-book, and the set-of-rules repository, and the program store for implementing the stored code, the code comprising: code to iteratively apply the set-of-rules associated with a respective contact member of a plurality of callees of the electronic address-book to iteratively attempt to establish a subsequent communication session when an attempt to establish a communication session via the communication interface using a communication address of a client device of the respective contact member fails, wherein each respective iterative attempt includes attempting to establishing further communication sessions defined by the sequence when previous attempts at establishing communication sessions have failed; wherein each respective communication session allows human language based communication between the caller and the callee.

Optionally, the sequence of at least one subsequent attempt includes at least one second communication address of the respective contact member or a second callee, and the code applies the set-of-rules to attempt to establish the subsequent communication session to the at least one second communication address of the client device of the respective contact member or the second callee. Optionally, the second callee is a second contact member stored within the electronic address-book, and the set-of-rules includes a map to the second contact member stored within the electronic address-book to access the at least one second communication address. Optionally, the second communication address of the second callee is stored as data in association with the entry of the respective contact member in the electronic address-book.

Optionally, the code to apply the set-of-rules executes in a background of the client device, and simultaneously a different application executes simultaneously in a foreground of the client device.

Optionally, the code attempts to simultaneously establish a plurality of subsequent communication sessions using different communication mediums by respectively executing different communication applications.

Optionally, the client device further comprises code to at least one of automatically generate and automatically update the set-of-rules of the respective contact member by learning manual user actions when establishment of the first communication session fails.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 4A-4H are some examples of sets-of-rules, in accordance with some embodiments of the present invention.

DETAILED DESCRIPTION

Figure 1:
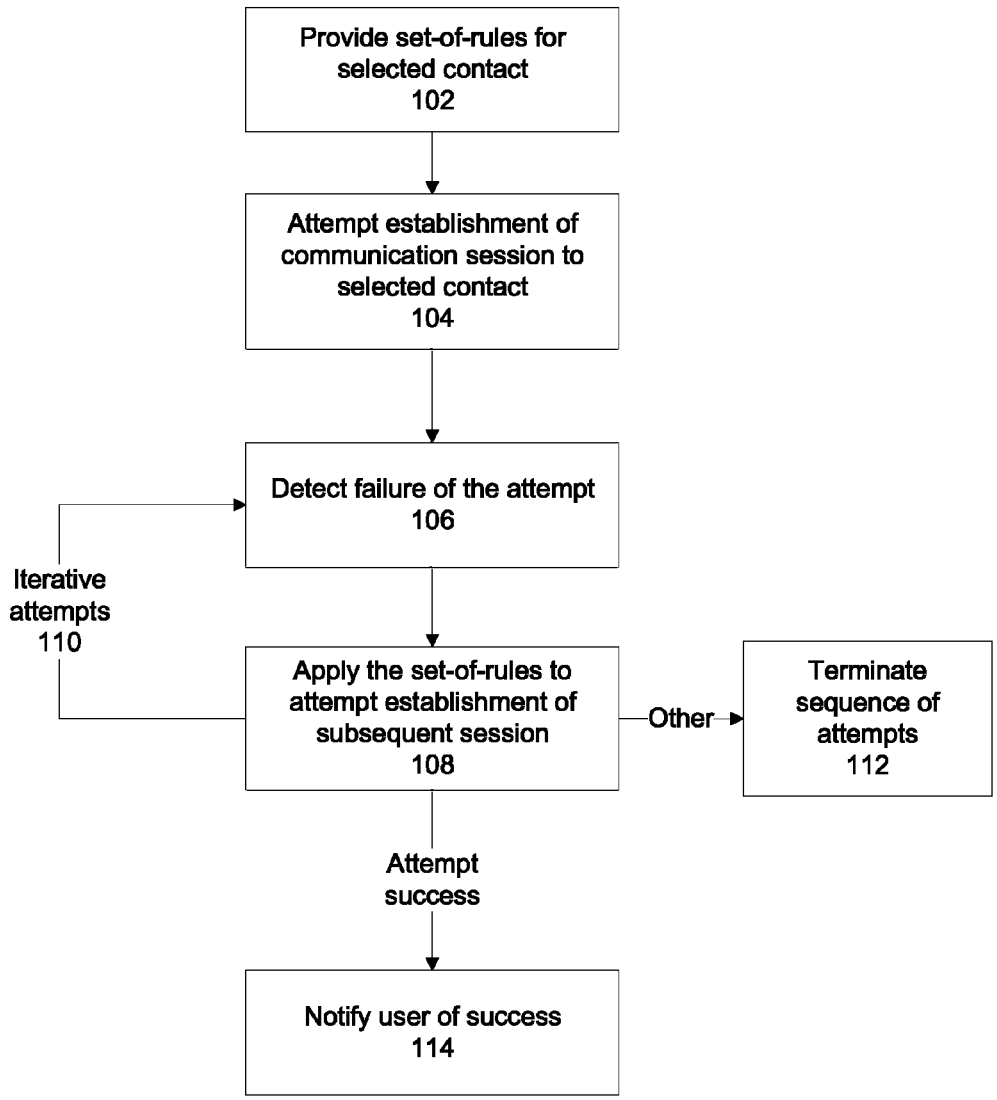
FIG. 1 is a flowchart of a computerized method for attempting to establish a communication session between a client device of a caller and a client device of a callee, in accordance with some embodiments of the present invention.

The present invention, in some embodiments thereof, relates to communication session management and, more specifically, but not exclusively, to systems and methods for communication session management based on user rules.

An aspect of some embodiments of the present invention relates to program code executable by a processor in communication with a client device of a caller (e.g., the client device itself, and/or a connecter server external to the client device), the program code containing instructions that apply a set-of-rules to iteratively execute a sequence of attempts at establishment of a communication session between the client device of the caller and a client device of the callee, optionally a phone call between phones (or other mobile devices), such as a phone call over a packet network (e.g., voice over internet protocol (VoIP)). Each failed attempt to establish the communication session is followed by a following attempt defined by the set-of-rules as a following action to perform. The program code follows the set-of-rules to achieve a predefined desired communication session. In this manner, the client device of the caller and/or the server attempting to reach the callee may free up resources of the caller device to allow the user to execute other applications (e.g., by the communication application executing in the background and/or by the server executing the attempts), instead of the communication application executing in the foreground (and optionally requiring constant user attention and/or user monitoring).

Optionally, the set-of-rules is stored in association with one of the contact members of an electronic address book, optionally in communication with the processor of the caller device. The set-of-rules may define the communication address for the sequence of attempts according to the communication address stored for the respective contact. Selection (e.g., by the user pressing an icon representing the contact using a graphical user interface) of the contact may automatically initiate the sequence of attempts at establishment of the communication session according to the set-of-rules related to the contact member.

Optionally, selection of the contact triggers transmission of an electronic message including the set-of-rules over a network to the server, for execution of the attempts to establish the communication session. Optionally, the server connects the caller device to the respective callee device when the server establishes the communication session based on the set-of-rules. Alternatively, selection of the to contact triggers activation of a local application installed on the caller device to attempt to establish the communication session.

Optionally, the set-of-rules define attempts at establishing the communication session to different communication addresses of the same contact member, optionally in a predefined sequence, dynamic or static, for example to different telephone numbers of the contact member. Alternatively or additionally, the set-of-rules define attempts at establishing the communication session to different contact members (i.e., different than the first selected contact member), for example, family members related to the contact member in a certain order.

Optionally, the electronic address book stores the set-of-rules, and communication addresses of the same and/or different contact members within a single contact member entry representing the sequence. Selection of the sequence member initiates application of the set-of-rules, at the external server or locally at the caller device. In this manner, the sequence is automatically followed, without requiring intermediate user intervention to initiate different calls.

Optionally, the set-of-rules include instructions to execute simultaneous communication session attempts, for example, simultaneous attempts to establish the same session with multiple different contacts (e.g., group electronic chat, conference call), and/or simultaneous attempts to establish different sessions with different contacts (e.g., multiple phone calls to different people, using different phone numbers and/or network phone connections).

Optionally, the set-of-rules includes instructions to execute attempts at establishment of the communication session using two or more different mediums, for example, a duplex texting and/or chat session, a short message service (SMS), a voice phone call over a phone network, and a call (e.g., voice and/or video) over a packet network such as the internet (e.g., voice over internet protocol (VoIP)). The different mediums may be executed simultaneously, such as two simultaneous attempts to establish communication sessions. The different mediums may be executed sequentially according to the order, such as an attempt at a voice call followed by an attempt at a chat session.

An aspect of some embodiments of the present invention relates to program code executable by a processor of a server in communication with multiple client devices. The code of the server follows a set-of-rules transmitted as a network to message by a client device, to iteratively execute a sequence of attempts at establishment of a communication session between the client device of the caller and a client device of the callee. Optionally, resources of the client device are freed up for other uses by transferring the attempts at the establishment of the communication session to the server. The server routes the established communication session back to the client device of the caller. In this manner, the user of the client device may use the resources of the calling device for execution of other applications, until the communication session has been established.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a to fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in to the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term communication session means a mechanism for allowing human language based communication between two human users (i.e., the caller and the callee), for example, a voice call, a videoconference call, and text-based electronic messages.

As used herein, the term attempt sometimes means attempt to establish the communication session, for example, for simplicity and/or clarify in the description.

Reference is now made to FIG. 1, which is a flowchart of a computerized method for establishing a communication session between a client device of a caller and a client device of a callee, in accordance with some embodiments of the present invention. The method applies a set-of-rules, to automatically execute a sequence of attempts at establishing a communication session between a client device of a caller and a client device of a callee when previous attempts at establishment of a communication session have failed.

The set-of-rules may be static and/or dynamic. The set-of-rules do not necessarily follow the certain order and/or the predefined sequence. The set-of-rules may define a set of predefined (dynamic or static) communication addresses and/or predefined contacts, from which the following contact and/or communication address is automatically designated for the attempt, for example, the set may include all contacts in the addressbook, the set may be defined dynamically (e.g., contacts in the same city as the caller), and/or the set may be manually defined by the user. The set-of-rules may define the following callee for the following attempt at establishment of the communication session based on, for example, facts obtained by a software module and/or sensor input, for example, time of day (e.g., accessed by code from the caller device and/or an external server), geographic location of the caller (e.g., accessed by code from a global positioning system module of the caller), geographic location of the callee, topic of discussion (e.g., analyzed by code based on subjects of messages), frequency of earlier communication sessions between the caller and the callee (e.g., by code analyzing a call history log file), and/or previous communication to sessions initiated from the callee. Alternatively, the set-of-rules may define a random selection of the following communication address from the set of predefined (dynamic or static) communication addresses. Each subsequent attempt may be different than a previous attempt, to a different communication address of the same callee, or to a different client device of a different contact callee.

Figure 2:
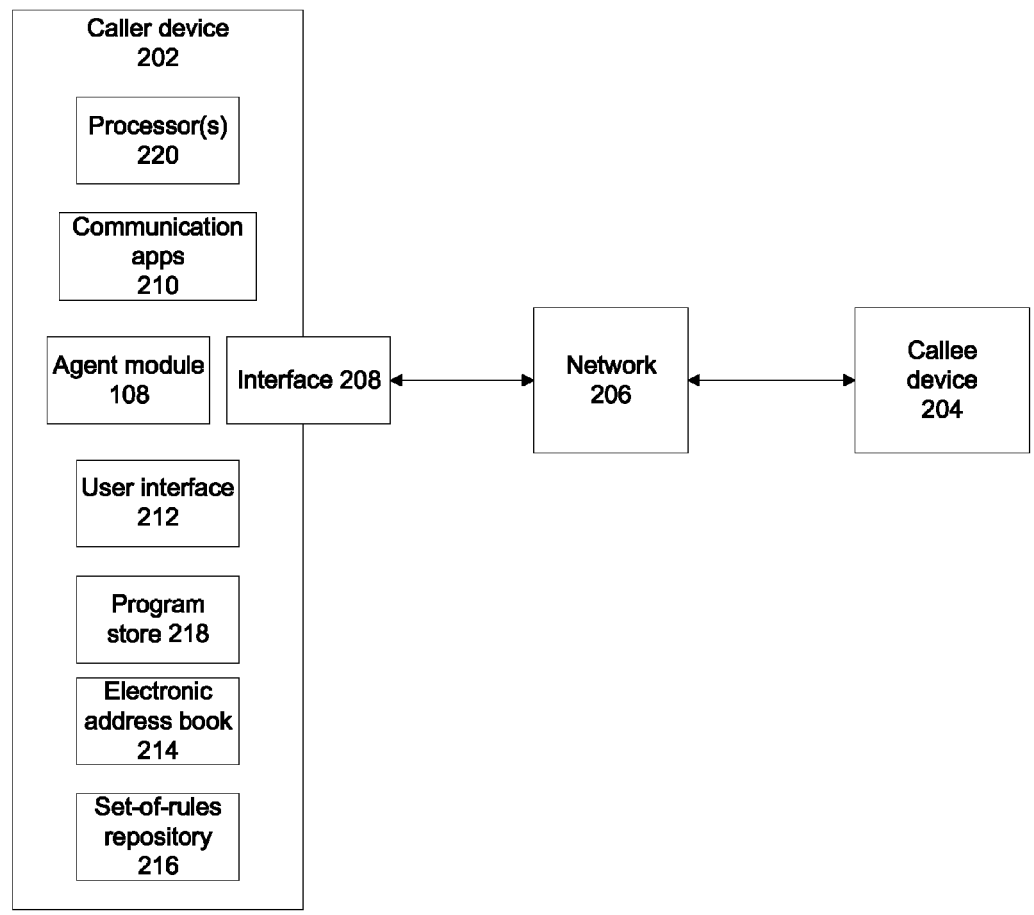
FIG. 2 is a block diagram of components of a system for attempting to establish a communication session between a client device of a caller and a client device of a callee, in accordance with some embodiments of the present invention.

Reference is also made to FIG. 2, which is a block diagram of a system that includes code that automatically executes a set-of-rules to subsequently attempt establishing communication sessions between the client device of the caller and a client device of a callee, in accordance with some embodiments of the present invention. The system may free-up resources on the client device while the attempts are being executed. The code of the system of FIG. 2 executes on the client device(s) to execute the attempts. As discussed below, the system of FIG. 3 executes code on servers external to the clients to execute the attempts. For the systems of FIG. 2 and FIG. 3, the set-of-rules are defined on the clients, with execution of the attempts performed at the client or by the server external to the client.

The code of the system described herein (and/or related method) may improve performance of the client device of the caller, by executing the communication session establishment attempts in a manner that frees up resources for execution by other processes and/or applications. For example, the code is executed by the external server, or executes in the background of the caller device during the attempts, while one or more other applications are executing in the foreground of the caller device. In this manner, the user may use the other applications while waiting for establishment of the communication session. As following the set-of-rules may take time, for example, minutes or hours, the client device may become available for execution of other applications in the meantime, improving utilization of the existing resources (e.g., processing and/or memory) of the client device.

The code of the system described herein (and/or related method) provides new electronic communication session establishment features that do not have direct corresponding manual actions. For example, the set-of-rules may be executed as a background process and/or executed by an external server, allowing the user to use the client device for execution of other programs while the attempt at establishment of the communication session is occurring simultaneously. Constant or intermittent intervention and/or monitoring of the attempts by the user is not required, allowing the user to attend to other applications. The set-of-rules define instructions to achieve a predefined desired communication result, without requiring manual user intervention.

System 200 includes a client device 202 (also referred to herein as a caller device) for communicating with a callee client device 204 (also referred to herein as a callee device) by establishing a communication session over a network 206 via an interface 208 of client device 202, to a communication address of callee device 204.

Caller device 202 and/or callee device 204 may be, for example, a mobile device, a Smartphone, a Tablet computer, a wearable computer (e.g., watch, glasses), a desktop computer, a laptop, or other device with communication capabilities. Network 206 may be, for example, a landline telephone network, a wireless telephone network, a wireless data network, the internet, a private network, and/or combinations thereof.

Caller device 202 includes or is in communication with a user interface 212, for providing output and/or accepting input, for example a touchscreen, a keyboard, a mouse, a camera, and a display.

Caller device 202 stores thereon or is in communication with one or more communication applications 210, for establishment of the communication session, for example, a voice calling application, a videoconferencing application, a network calling application (e.g., voice over IP), a text messaging application, an email application, and an electronic chat application.

Communication sessions may be one or more of: a voice phone call, a network voice call, a videoconference call, an electronic message chat, and exchanges of electronic messages (e.g., email, and text messages).

Optionally, caller device 202 stores thereon or is in communication with an electronic address book 214 that stores contact members (e.g., as electronic records, optionally represented by icons) with one or more related communication addresses for establishment of the communication session, for example, cellular phone number, work phone number, email address, network calls electronic address, and text message address. The contact members may be distributed and/or shared with others, for example, with devices of other callees, with electronic address books of other callee devices, and/or with a central server.

Caller device 202 stores thereon or is in communication with a set-of-rules repository 216 that defines a sequence of one or more subsequent attempts at establishing a communication session, as described herein. Optionally, a different set-of-rules is stored for different contact members of the electronic address book, such as each member having an associated set-of-rules. Optionally, the set-of-rules define additional communication addresses of the same contact for subsequent communication session establishment attempts. In this manner, the code attempts to reach the same contact at a different address, for example, a different phone number. Alternatively or additionally, the set-of-rules associated with the contact member define different communication addresses of other contact members different than the respective contact member for subsequent communication session establishment attempts. In this manner, the code attempts to reach other contacts instead of the original contact, for example, family members, friends, and/or coworkers of the contact.

Each set-of-rules may be stored as a field related to the address book contact entry, and/or mapped to the address book contact entry, for example, by accessing an interface of the address book application, for example, an application programming interface (API). The set-of-rules may be defined as code written in text characters, as compiled instructions, or other representations.

Caller device 202 stores thereon or is in communication with a program store 218 storing code, as described herein.

Caller device 202 includes a processor 220 coupled to interface 208, electronic address book 214, set-of-rules repository 216, communication applications 210, and program store 218.

At 102, the set-of-rules is provided. Different sets-of-rules may be provided for different contacts, such as contacts stored in the electronic address book 214. Alternatively, the same set-of-rules may be provided for different contacts. Alternatively, different sets-of-rules may be provided for the same contact.

The set-of-rules may be manually programmed by the user, for example, written in domain specific language, and/or generated using a compiler or parsing application that provides a graphical user interface. For example, the set-of-rules may be a table of the attempts in the sequence, allowing the user to fill in each entry using existing data and/or manually entered data, such as by links to electronic address book 214 and available communication applications 210.

The set-of-rules may be downloaded from an external device, for example, from a client of another user or a server.

The set-of-rules may be automatically generated by code implementable by processor 200 that analyzes social relations from a social network (e.g., online social network), from a family tree (e.g., stored locally in a repository, accessible on a online website, and/or derivable from an analysis of a social network webpage), and/or patterns in a history of actually dialed numbers (e.g., stored locally in a dialing history log file). For example, the code may analyze the dialing history of the caller to determine the 3 top contacts that the caller called. The generated set-of-rules may define the order of the 3 top callers based on frequency of attempted calls. In another example, the code may analyze the social network webpage of the caller to identify 5 family members, such as: mother, father, spouse/partner, brother, sister, cousin, and child. The generated set-of-rules may include the 5 identified family members in a predefined order.

The set-of-rules may be automatically generated by code implementable by processor 220 that applies machine learning algorithms to identify a dialing pattern and/or communication session establishment tries (e.g., manual user actions) performed when a previous attempt at establishment of a communication session fails. The code may analyze the manual user actions in real time as they are being performed (e.g., via an API of the calling application), and/or analyze the manual user actions after they have been performed (e.g., from a log file of historical call attempts). For example, when no set-of-rules is related to a certain contact, the user may manually try calling different numbers of the contact to reach the contact. The code learns the sequence of tries to automatically gather different callees, and generate the set-of-rules according to the gathered callees. It is noted that multiple sets-of-rules may be learned for each contact. The code may automatically update an existing set-of-rules by analyzing a dialing pattern and/or communication session establishment tries, such as according to the manual user behavior. For example, the code may perform a text analysis of messages which follow a call attempt, for example, to identify that the user sends an SMS message to the caller stating 'tried reaching you, please call me back ASAP). In this example, the code updates the set-of-rules to send the SMS message to the callee when a call attempt fails. Alternatively or additionally, the code may automatically update a generated set-of-rules, for example, by appending a default attempt to execute at the end of the sequence (i.e., the last entry in the sequence). Optionally, the set-of-rules includes (or is modified to include) transmitting an electronic text message to one or more electronic message communication addresses of the contact member stored in the electronic address book, for example "I tried to reach you, please call me back".

At 104, a first attempt to establish the communication session is executed, for example, by the user manually selecting the contact member from electronic address book 214, and optionally selecting the communication address. For example, the user selects a contact member and phone number for attempting a phone call.

Alternatively, the sequence of attempts is automatically triggered by code in response to a detected event, for example, based on manual user input, based on sensor data, and/or based on data acquired by the code (e.g., from an external server and/or local data repository). For example, the sequence is automatically triggered in response to the user manually pressing an emergency call button (on the device and/or external to the device and communicating with the device), and a GPS module on the device detecting the location as being in unauthorized area, for example, inside a river.

Optionally, the attempt proceeds as previous (i.e., prior to installation of the set-of-rules and related code), for example, the relevant communication application accesses communication interface 208 of caller device 202 via network 206 to try and reach callee device 204 at a communication address. In such a case, the code monitors the attempt for failure, as described herein. Alternatively, the attempt follows the set-of-rules, such as when the contact member of electronic address book 214 is mapped to the set-of-rules, which define the first (and subsequent) communication session establishment attempts. In such a case, the contact member details may not exist independently of the set-of-rules.

At 106, the code detects failure of establishment of the communication session attempt. The failure may be defined by the set-of-rules for each contact member, and/or by a global set-of-rules default.

Optionally, the code detects a failure to acquire a real time human response, for example, an immediate response (e.g., by the callee answering the ringing phone call), or a short delay response (e.g., by the callee replying with a text message, an email, or by initiating a different communication session back to the caller) such as within about 10 seconds, within about 30 seconds, within about 1 min, and within about 5 minutes.

The failure may be identified for a voice based call, based on, for example, one or more of: a predefined number of unanswered telephone rings, a busy signal, a signal representing the callee is on another line, a forward to a voicemail box, and/or an electronic indication that the callee is busy and/or unavailable (e.g., which may be accessed through an interface (e.g., API) related to the client device of the callee, such as an online status).

The failure may be identified for an electronic text based session, based on, for example, a predefined delay in receiving a response from the callee (e.g., within the same chat session and/or as a separate reply message such as an email), and/or an electronic indication that the callee is busy and/or unavailable (e.g., which may be accessed through an interface (e.g., API) related to the client device of the callee, such as an online status showing, for example, away, busy, not online, or unavailable).

At 108, the code applies the set-of-rules (e.g., from set-of-rules repository 216) associated with the selected contact member, to iteratively attempt, by one or more attempts, to establish a subsequent communication session.

Optionally, the sequence is operated in response to a user selection made when the first contact in the sequence (i.e., the selected contact of block 104) is not responsive (i.e., failure detection of block 105), for example, a popup with a button appearing when no answer tone is played and/or the like. The user may manually select to execute the sequence. Alternatively, the sequence is automatically executed. Alternatively, the sequence is automatically executed when a condition is met, for example, a time of day, a predefined user preference, and the caller is in a predefined geographical location.

Optionally, the code executes the relevant entry in the set-of-rules to attempt to establish the subsequent communication session to the one or more different communication addresses of the client device of the same selected contact member, for example, a different phone number. Alternatively, the code executes the relevant entry in the set-of-rules associated with the selected contact member to attempt to establish the subsequent communication session to a communication address of a different contact member, which may be defined in electronic address book 214 to and/or stored as part of the set-of-rules. It is noted that the stored address of the different contact member (or a different address of the selectee contact member) as part of the set-of-rules may not be directly accessible for selection as the first communication attempt.

Optionally, the subsequent communication session is attempted using the same communication medium and/or the same communication application 210 as the previous attempt. The same medium may be used, for example, based on user preference and/or communication ability of the medium. For example, phone calls may be used to try to reach a living person. Alternatively, the subsequent communication session is attempted using a different communication medium and/or different communication application 210 than the previous attempt. For example, the initial attempt may be a phone call to a phone number, and the subsequent attempt may be an electronic messaging session to an electronic message address. Different media may be used, for example, based on user preferences and/or different availability of the callee. For example, the callee may be in a meeting unable to answer a phone call, but able to respond to a text message.

Optionally, the code applies the set-of-rules to simultaneously attempt to establish multiple subsequent communication sessions (optionally using different communication media and/or different communication applications 210) to multiple communication addresses of the same selected contact member. For example, the mobile phone is called, the home phone is called, and a chat session are initiated simultaneously. The simultaneous attempts may occur, for example, instead of a sequence of single attempts. The simultaneous sessions may be executed, for example, to save time in trying to reach the selected contact.

Alternatively or additionally, the code applies the set-of-rules to simultaneously attempt to establish a single subsequent communication session to multiple different contact members (e.g., other than the selected contact) via multiple communication addresses. The single communication session is attempted using the same communication medium and/or the same communication application 210. For example, the single communication session is a conference phone call made to phone numbers of multiple contacts, and/or a group electronic chat session using invitations sent to multiple electronic chat addresses of contact members. The set-of-rules may define cases in which less than all of the defined contacts have joined the communication session. For example, the set-of-rules may define a minimum number of participants may define success of establishment of the session, without further attempts to connect the other callees, for example, connect to at least 3 out of 5 contacts. In another example, the set-of-rules may define replacements to attempt to connect to when first attempts at joining callees have failed, for example, if John cannot be connected to the conference call, try connecting Jane.

Optionally, the code applies the set-of-rules sequentially, without introducing additional details between subsequent attempts. Alternatively, the code delays execution of the subsequent attempt. The delay may be defined by the set-of-rules for each contact entry, and/or globally as a default. The delay may be the same or different between subsequent attempts, for example, wait 5 minutes, wait 10 minutes, wait 1 hour, or wait 1 day.

Optionally, the code applying the set-of-rules executes in a background of caller device 202, for example, as a minimized window. A different application and/or process may simultaneously execute in a foreground of the client device, for example, as the major portion of the screen of the device. As following the set-of-rules may take time, for example, minutes or hours, the client device may become available for execution of other applications in the meantime, improving utilization of the existing resources (e.g., processing and/or memory) of the client device.

Optionally, at 110, the code iteratively attempts to establish additional communication sessions defined by the relevant portion of the sequence of the set-of-rules when previous attempts at establishing communication sessions have failed.

Optionally, the set-of-rules define the failure and/or success of each communication session attempt. Alternatively or additionally, the set-of-rules define the failure and/or success for all attempts in the sequence. Alternatively or additionally, the failure and/or success is globally defined, for example, in a configuration file stored on the server and/or locally on the client.

Optionally, the code (executing on the caller device and/or server) iteratively follows the sequence (e.g., by repeating the sequence as described herein) until a communication session is established with a callee. In such a manner, the system helps ensure that the caller always reaches one of the contact callees, even when a large number of attempts are required and/or when the attempts take a long time. Optionally, the code continues the iterative attempts until a human communication to session is established with any of the previous and/or current callees, for example, by receiving an incoming session from one or more of the previous callees, and/or when one or more of the current and/or previous callees answers the session attempt.

Blocks 106 and 108 are iterated, as described herein.

Optionally, the code implementable by the processor of the client device repeats the sequence, optionally from the beginning, when the last entry in the set-of-rules defining the last communication attempt has failed. The repetition may be defined by each set-of-rules, and/or globally as a default. The iteration may be performed at the same rate as the initial set-of-rules, and/or including one or more details, for example, initiate after 10 minutes, after an hour, or after a day.

Alternatively to 110, at 112, the code terminates execution of execution of the set-of-rules. Termination may occur prematurely (i.e., before the last step in the sequence defined by the set-of-rules), or after the sequence has been completed.

The code may prematurely terminate the connection attempt, during the attempt itself. Alternatively, the code may prematurely terminate the sequence after the current attempt has failed and/or before the next attempt has initiated.

Optionally, the code prematurely terminates the execution when a response is simultaneously, during the attempt, being received from a contact member and/or contact address that has previously been attempted and failed, for example, a contact member returning a phone call by initiating a new phone call while the code is attempting another phone call according to the set-of-rules. The code determines the origination address and/or origination contact member of the new incoming communication session, to determine whether to terminate the current execution of the attempt. Optionally, the code establishes a new communication session by accepting the incoming simultaneous communication session. In this manner, returning phone calls are automatically answered.

Optionally, when the sequence has been completed without successfully establishing the communication session (and when there are no instructions to repeat the sequence), the user is notified, for example, the user is provided with a busy signal, with a pop-up message, or with an audio message.

Optionally, at 114, the communication session has been successfully established with the callee in the current communication attempt. The communication session is established as defined by communication address, contact member, communication medium, and/or communication application, as defined by the set-of-rules.

Optionally, the code analyses the sequence of failed attempts in an effort to try and improve the efficiency of the sequence, for example, reducing the number of failed attempts and/or reducing the time to connect to a callee. The code may analyze the sequence of failed attempts in real time (e.g., via an API of the communication applications) and/or analyze a log file storing details of the history of the attempts. The code may analyze the sequence of failed attempts in isolation, and/or in view of other sequences from other attempts (e.g., previous attempts of the caller). The code may adapt the set-of-rules based on the analysis. For example, the code may change the set-of-rules to change the sequence to include the first communication session attempt to be made to the contact and/or address which results in establishment of the session. For example, the code may change the set-of-rules to reduce the number of dialing tries for each failed attempt, for example, from 8 rings to 3 rings.

Optionally, the user is notified of the success of the establishment, for example, by returning the executing code to the foreground of the device (e.g., major display on the screen), by an electronic message (e.g., flashing light, displayed message), and/or audio sound (e.g., beep, or voice of callee is projected through a speaker).

Figure 3:
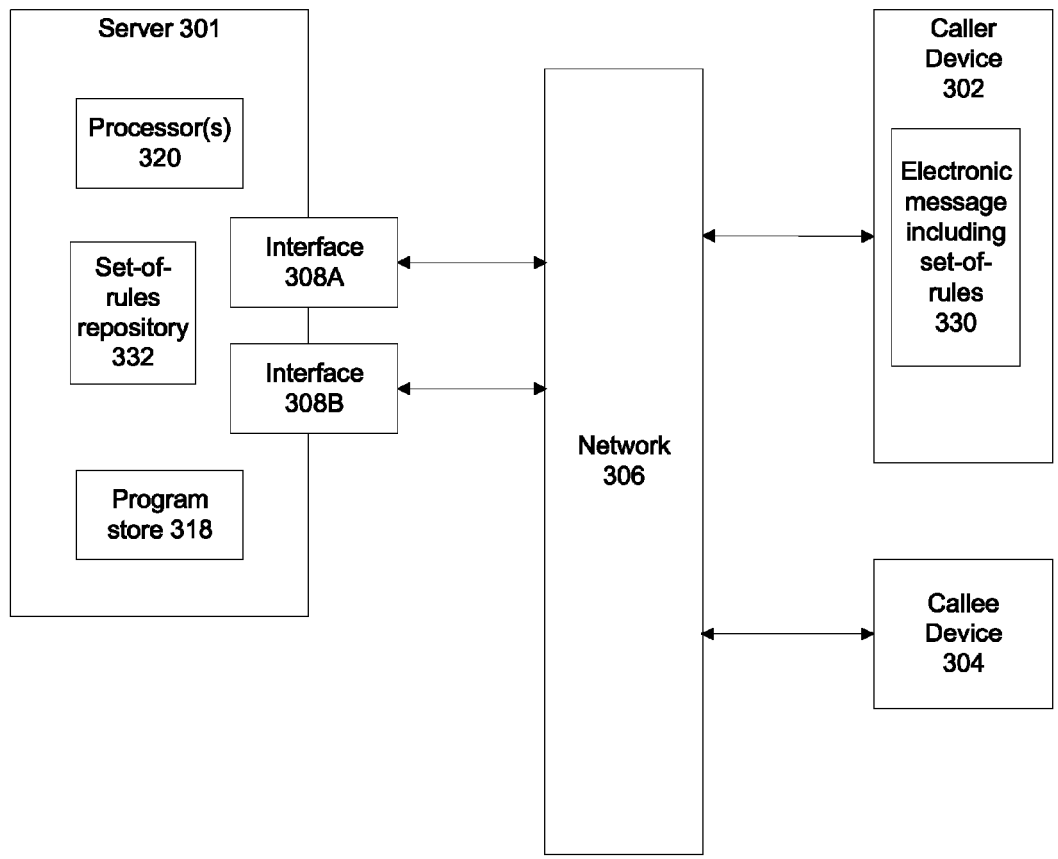
FIG. 3 is a block diagram of components of another system for attempting to establish a communication session between a client device of a caller and a client device of a callee, in accordance with some embodiments of the present invention.

Reference is now also made to FIG. 3, which is a block diagram of another system for establishing a communication session between a caller device and a callee device according to a set-of-rules, in accordance with some embodiments of the present invention. System 300 includes a server in communication with the caller device and the callee device, the server executes the connection establishment attempts and routes the connection upon successful establishment back to the caller device. In this manner, resources (e.g., processor, network bandwidth, communication interface channel and/or memory) which perform the attempts are freed-up at the caller device, the functions being taken up by the server, which improves performance of the caller device, as the freed-up resources are available for other users.

System 300 includes a server 301 in communication with one or more caller client devices 302 (one is illustrated for clarity) and one or more callee client devices 304 (one is illustrated for clarity) via a network 306. Server 301 is external to devices 302 and devices 304. It is noted that each device 302 and/or 304 may act as both a caller and a callee.

Optionally, server 301 includes a first interface 308A for communicating with caller devices 302 and a second interface 308B for communicating with callee devices 304. It is noted that interfaces 308A and 308B may be the same interface. Alternatively, a single interface communicates with both caller and callee devices.

Server 301 has stored thereon and/or is in communication with a program store 318 storing code, as described herein.

Server 301 includes a processor 302 coupled to first interface 308A, second interface 308B, and program store 318 for implementing the stored code.

Optionally, server 301 has stored thereon or is in communication with a set-of-rules repository 332 that stores sets-of-rules transmitted by callee devices 304 and/or caller devices 302 for storage within repository 332. Each set-of-rules may be associated with a communication address (or other contact member representation) of the callee device and/or caller 302, for execution when another set-of-rules is executed by server 301, as described herein and exemplified below. In this manner, one set-of-rules may trigger execution of another set-of-rules, such as in a nested manner, in a sequential manner, and/or in an iterative manner. For example, a first set-of-rules transmitted by caller device 302 is executed by server 301. The first set-of-rules defines calling callee device 304, which is associated with a second set-of-rules stored within repository 332. As such, server 301, in trying to establish the communication session with callee device 304, now executes the second set-of-rules stored in repository 332, which may have been provided by callee device 304.

Components of caller device 302 have been discussed with reference to caller device 202 of FIG. 2. It is noted that the code stored in program store 218 for executing the set-of-rules associated with a selected respective contact is not necessarily present. Instead, program store 218 may include code for communicating with server 301 (which executes the attempts to establish the communication session), as described herein.

Optionally, code stored in program store 218 of caller device 302, implementable by processor 220, automatically performs one or more of the following functions:

Identifying the respective contact member according to a manual user input (e.g., the user pressing an icon representing the contact member using a GUI), and designating the set-of-rules that is mapped to the respective contact member (e.g., stored in repository 216). It is noted that in this manner, the dialing (e.g., when a call is attempted) to the callee device is performed by server 301.

Automatically generating an electronic message 330, which includes at least the designated set-of-rules. Electronic message 330 may include additional details, such as the communication addresses for the attempts defined by the set-of-rules. Electronic message 330 may be implemented as an instruction set for execution by processor 320 of server 301, for example, a script written in text characters, machine readable code, or other representations.

Transmitting the set-of-rules, optionally as electronic message 330 over the network, from the caller device to server 301.

Connecting to the callee device over the network, via the communication session established by server 301.

Sever 301 may provide a user experience to the user of the caller device that is similar to making a standard phone call. The user may dial a phone number in a manner that is similar to making the standard phone call, for example, selecting an icon of a contact member from the electronic address book using a graphical user interface of the caller device, as described herein. Dialing (i.e., selecting) the contact member triggers transmission of the set-of-rules to the server for execution of the attempts at establishment of the communication session. The server follows the set-of-rules to attempt to obtain a dialing signal (or an answered call) with a phone of one of the callees, and routes the session back to the caller. The user of the caller device, after dialing the contact member, now hears the dialing signal or is connected to the phone of the one of the callees defined by the set-of-rules, that the server was able to reach. In this manner, the user dials (i.e., selects) a single item (e.g., icon, single contact member, group icon) and is automatically connected to one of multiple callee devices, as defined by the set-of-rules, or optionally provided with a busy signal (or other notification) when none of the callees were reached, instead of, for example, manually dialing each of the different numbers of the callees. The server provides for the seamless user experience based on existing phone calling procedures, of the user dialing a single item and then directly being connected to one of the callee devices.

System 300 may execute the method of FIG. 1. Details of the method as performed by system 300, such as blocks executed by the server, are now described.

At 102, code implementable by the processor of the server receives from one or more of caller devices 302, an electronic message including a set-of-rules associated with a callee. The set of-rules define a sequence of one or more subsequent attempts at establishing a communication session with the callee (or subsequently other contacts), to respective communication addresses, as described herein.

The electronic message may include the communication addresses of each callee defined by the set-of-rules. The electronic message may include sufficient instructions and/or data for independent execution by server 301.

Server 301 may simultaneously apply multiple sets-of-rules from different caller devices 302 to different callee devices 304.

Resources of the caller device 302 sending the electronic message are freed-up (i.e., as server 301 applies the set-of-rules to execute the attempts using its local resources instead of device 302), becoming available for other uses, such as local execution of other processes and/or applications.

At 104-112, the code on the server applies the set-of-rules to attempt to establish the subsequent communication session with callee device 304 via the interface using network 306 when the previous session fails, and optionally attempts additional sessions as defined by the sequence of the set-of-rules when earlier attempts have failed, as described herein.

It is noted that server 301 may retrieve and execute a second set-of-rules from repository 332, such as when such second set-of-rules is associated with the communication address of callee device 304 defined by first set-of-rules 330. Instead of attempting the communication address defined by set-of-rules 330, server 301 follows the second set-of-rules mapped to the communication address.

It is noted that alternatively, the electronic message may be transmitted from the caller device(s) 302 to server 301 after the first failure detection, to apply the set-of-rules for subsequent attempts.

At 114, when the communication session has been successfully established, the code implementable by the processor of sever 301 routes the established communication session back to the respective caller device 302, to allow communication between caller device 302 and callee device 304.

Optionally, the communication session is established when the code identifies a ring tone to the phone of the callee. The caller device may be connected in the ring tone state, even before the callee answers. In this manner, the user may select the number of rings to wait. Alternatively, the communication session is established when the code identifies a voicemail box of the phone of the callee. The caller device may be connected in time to leave a voice message to the callee. Alternatively, the communication session is established when the code identifies that the callee has answered the phone call.

Optionally, the communication session fails when the code identifies one or more of: a busy signal, a signal representing the callee being on another line, a signal representing the callee device is off, a signal representing the callee device is unavailable (e.g., electronic status), and a signal representing a forward to voicemail. The definition of the failure to establish the session may be predefined and/or configurable, globally and/or for each set-of-rules.

Reference is now made to FIGS. 4A-4H, which are some not necessarily limiting examples of sets-of-rules, as described herein, in accordance with some embodiments of the present invention. For clarity and simplicity, the sets-of-rules are represented as a table, however, as described herein, such a representation is not necessarily limiting, as the sets-of-rules may be represented in other format, for example, as a flowchart, as text-based code organized into a script, and/or other instruction formats. Data storage formats may include, for example, objects, records, a text file, compiled code, arrays, or other suitable formats. It is noted that FIGS. 4A-4H may represent electronic messages transmitted by the caller device to the server for execution by the server, for example, as discussed herein.

The table may be filled in by a user using a graphical user interface (which may then be parsed to generate the set-of-rules for execution), manually written by the user, and/or automatically generated by software code.

Some possible data fields (as columns) that are related to each attempt:

Attempt #: the attempt within the sequence.
Contact Name: the name of the callee.
Description: the client device of the callee.
Communication address: the address to use in attempting to establish the session with the client device.
Details of application: addition details related to applying the set-of-rules of the current attempt. For example, how failure of session establishment is detected (e.g., number of unanswered phone rings), text to send in an automated message, and instructions to repeat the sequence.
Delay before attempting: length of delay added before attempting to establish the session.

It is noted that some fields are optional, for example, contact name, description, details of application, and/or delay before attempting. When some fields are empty, for example details of application, default values may be used. Some fields may be inserted for the human user, to make the table more readable, for example, description. Some fields may be inserted as a mapping to the electronic address book, for example, contact name may map to the contact entry in the electronic address book.

Each example set of rules is now described.

FIG. 4A depicts a set-of-rules to attempt to reach a friend, John Smith, by first trying his mobile number, then his work number, then his home number. When all phone call attempts have failed, an email is automatically sent. When the email has not been responded to, the sequence is repeated after an hour delay.

The set-of-rules may be mapped to the John Smith entry in the electronic address book, which may be a pre-existing entry independent of the set-of-rules.

FIG. 4B depicts a set-of-rules to attempt to reach a member of the caller's family, by first trying the mobile device of his wife, then his son, then his daughter, and then the house landline.

The set-of-rules may be mapped to an entry created in the electronic address book representing the whole sequence, for example, family.

FIG. 4C depicts a set-of-rules in which a first failed attempt to reach one worker is followed by at attempt to set up a conference call with several workers (e.g., other members of the same team). Such a set-of-rules may be used, for example, by a supervisor trying to get an update from the team by first trying to reach the team leader, and when the attempt fails to reach the members of the team.

FIG. 4D depicts a set-of-rules in which a first failed attempt to reach a person (e.g., mother) is followed by simultaneously attempts to communicate with multiple to people (e.g., friends) using different channels, such as a phone call, a text message, and an email. Such a set-of-rules may be used, for example, by a woman going into labor, to try and reach her mother, and then to try to reach one or more of her friends, before giving birth.

It is noted that FIGS. 4A-4D may refer to static sets-of-rules.

FIG. 4E depicts a dynamic set-of-rules in which the attempts to execute depend on the time of day. The first attempt to call the front desk is executed when the time of day is between 9 AM and 5 PM. The second attempt to reach the security desk is executed when the time of day is between 5 PM and 9 AM. The third attempt to reach the mobile phone of the security guard is executed when the time of day is between 5 PM and 9 AM and there is no answer at the security desk (i.e., attempt 2 failed). Such a set-of-rules may be used, for example, by a tenant of a building trying to reach somebody in charge of the building.

It is noted that the time of day may be retrieved by the code, for example, by accessing an external time server, and/or by querying the local operating system for the current time.

FIG. 4F depicts a dynamic set-of-rules in which the attempts to execute depend on the time on the geographical location of the caller. The set-of-rules calculate the geographical distance from the caller to each of the friends defined in a set. Attempts are made to establish communication sessions to home phones of the friends according to an increasing geographical distance. For example, the closest friend (e.g., Friend 2) is attempted first, followed by the next closest friend (e.g., Friend 4), followed by the next closest friend (e.g., Friend 3), and then attempting the furthest friend (e.g., Friend 1). Such a set-of-rules may be used, for example, by a caller trying to get together for a quick cup of coffee with a friend.

It is noted that the geographical location of the caller may be retrieved by the code from an output of a GPS module of the caller device. The geographical locations of the friends may be stored as address fields in the electronic address book.

FIG. 4G depicts a set-of-rules based on establishing a communication session based on an instant messaging (IM) medium. In a first attempt, an instant message session is launched with Associate 1, to the address FREDDY1975. The set-of-rules define waiting 5 minutes to receive a response to the instant message, or a read to notification that the callee has seen the message. In a second attempt, an instant message session is attempted with Associate 2. The wait time is increased to 10 minutes, for example, to allow more time for the response before the next attempt. In a third attempt, a group chat session is attempted, by inviting 3 different external consultants. Such a set-of-rules may be used, for example, by an engineer that encountered a technical question, and is trying to get a quick response, first from internal associates, and when unreachable, from external consultants.

FIG. 4H depicts a set-of-rules for calling a family, for example, by selecting a group icon. In this example, the set-of-rules are used to define the failure and/or success of each communication session attempt. In a first attempt to reach the mother on her mobile phone, the set-of-rules define failure as a busy signal, and success as another signal, such as ringing of the callee device, that the callee is on another line, or voicemail, the set-of-rules define. Attempt #2 is executed when the busy signal is detected by the code, and the caller device is connected when the other signal is detected. In attempt 2, failure is defined by a busy signal or the callee being on the other line. In attempt 3, failure is defined as the busy signal, callee on the other line, or being forwarded to voicemail. In attempt 4, failure is defined as the busy signal. When all attempts have failed (i.e., execution of the sequence is completed), the user is notified, for example, with a busy signal, an audio message saying no callees are reachable, or a pop-up message on the screen of the caller device.

It is noted that one set of-rules may trigger execution of another set-of-rules, as described herein. For example, a server (e.g., 301) executing the set-of-rules of FIG. 4D, executes attempt #1, which includes instructions to call mother. Instead of dialing the mobile number 1212121, the server retrieves from the set-of-rules repository (e.g., 332) a second set-of-rules defined for mother and/or mobile number 1212121 (e.g., transmitted from the mobile device of the mother for storage in repository 332). In the example, the second set-of-rules is defined by FIG. 4B. Therefore, server 301 now executes second set-of-rules, and attempts to call mother following attempt #1 of FIG. 4B, which when fails, calls son at 2222222. As such, the caller may be connected to son.

FIGS. 5A-5D are some examples of mappings between entries in a electronic address book and sets-of-rules, in accordance with some embodiments of the present invention. The mappings may be implemented, for example, as a pointer stored as part of the address book to the respective set-of-rules, as an interface (e.g., API, such as a function call), and storing the set-of-rules as a field, record or other data representation within the electronic address book.

For example purposes, an electronic address book 502 (which may correspond to electronic address book 214) includes entries of contact members A-E. Mappings between the entries of address book 502 and sets-of-rules stored in repository 504 are described (which may correspond to set-of-rules repository 216).

Figure 5A:
FIGS. 5A-5D are some examples of mappings between entries in an electronic address book and sets-of-rules, in accordance with some embodiments of the present invention.

FIG. 5A depicts a mapping of:

Contact member A to set-of-rules A.

Contact member B to set-of-rules B1 and set-of-rules B2. In such a case, the same contact entry is mapped to two (or more) different sets-of-rules. The particular set-of-rules to apply may be selected, for example, manually by a user (e.g., via a graphical user interface), and/or automatically by software according to additional rules (which may be associated with each set-of-rules), such as time of day, geographical location, and other factors.

Contact member C is not currently associated with a set-of-rules.

Contact member D to set-of-rules A. In such a case, both contact members A and D map to the same set-of-rules, for example, different contact entries of co-workers may be mapped to the same set-of-rules that define contacting the same supervisor of the co-workers.

Contact member E to set-of-rules E.

It is noted that the set-of-rules associated with each contact member may be transmitted to the server (e.g., as shown in FIG. 3 and discussed herein) for execution upon selection of the contact member by the user (e.g., the user pressing an icon representing the contact member using a graphical user interface), for example, as an electronic message over a network (e.g., as described herein). Alternatively, the set-of-rules may be locally executed by the client, for example, as described herein.

Figure 5B:
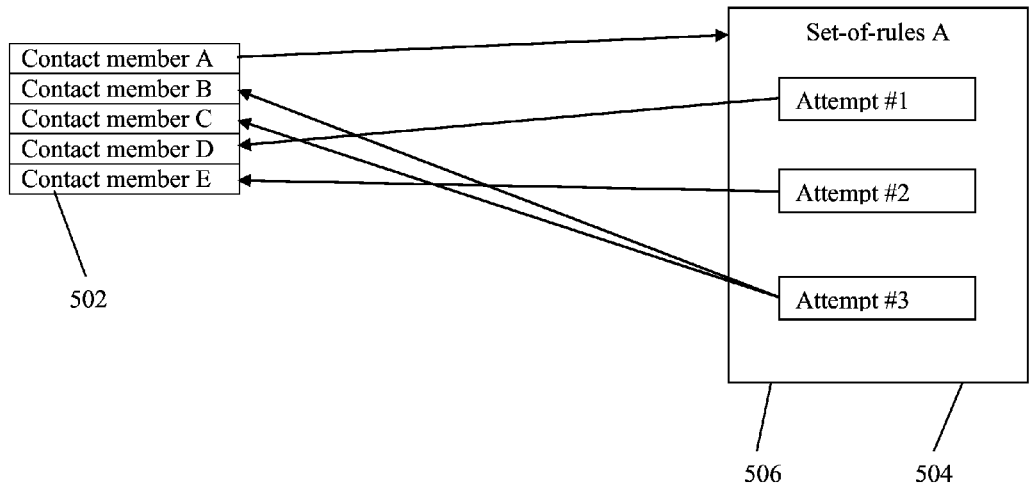

FIG. 5B depicts mappings between set-of-rules A back to entries of electronic address book. A failure to establish a session with contact member A of address book 502 applies set-of-rules A 506 stored in repository 504, as described herein. The attempts to establish subsequent communication sessions are based on attempts to reach other contacts in address book 502, as defined by the mappings.

Attempt #1 maps to contact member D of address book 502.

Attempt #2 maps to contact member E of address book 502.

Attempt #3 maps to both contact members B and C of address book 502 (i.e., to attempt a simultaneous session).

Figure 5C:
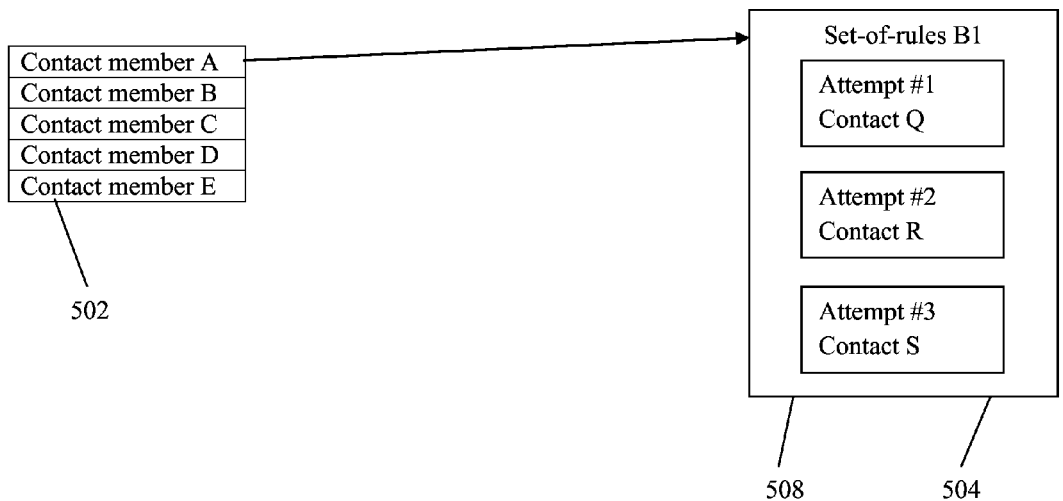

FIG. 5C depicts set-of-rules B1 508 stored in repository 504, which is mapped to from contact member B of address book 502. Set-of-rules B1 508 defines contact details to attempt to establish communication sessions (i.e., without mapping back to address book 502):

Attempt #1 defines details to attempt a session to contact Q.

Attempt #2 defines details to attempt a session to contact R.

Attempt #3 defines details to attempt a session to contact S.

As such, contacts Q-S are not defined by address book 502, and attempts to establish connections are not directly available to the user (i.e., as a first attempt). Attempts to establish sessions with contacts Q-S are sequentially executed when the attempt to establish the session with contact member A fails.

Figure 5D:
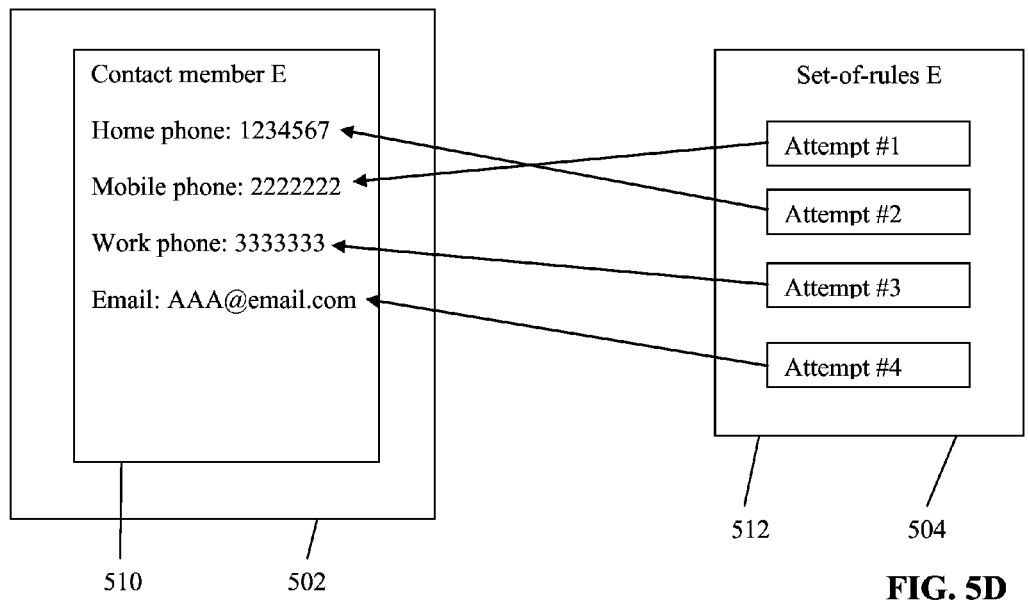

FIG. 5D depicts mappings between set-of-rules E back to other fields of the same electronic address book contact member E. A failure to establish a session with contact member E 510 of address book 502 applies set-of-rules E 512 stored in repository 504, as described herein. The attempts to establish subsequent communication sessions are based on attempts to reach other communication addresses stored as fields of contact member E 510 in address book 502, as defined by the mappings.

Attempt #1 maps to Mobile phone number of contact member E 510.

Attempt #2 maps to Home phone number of contact member E 510.

Attempt #3 maps to Work phone number of contact member E 510.

Attempt #4 maps to Email address of contact member E 510.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant client devices, networks, processors, and servers will be developed and the scope of the terms client devices, networks, processors, and servers are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for establishing a communication session between a client device of a caller and a client device of a callee, comprising:
   iteratively attempting to establish a communication session, via a communication interface of a client device of a caller, to a communication address of a client device of one of a plurality of callees represented as contact members stored in an electronic address-book, wherein each respective iterative attempt includes:
   detecting failure of the establishment of the communication session;
   applying a set-of-rules associated with the respective contact member and stored in a set-of-rules repository, to attempt to establish a subsequent communication session via the communication interface; and
   attempting to establishing further communication sessions defined by a sequence of the set-of-rules when previous attempts at establishing communication sessions have failed;
   wherein each respective communication session allows human language based communication between the caller and the callee.

2. The method of claim 1, further comprising:
   transmitting the set-of-rules from the client device of the caller to a server external to the client device of the caller and the client devices of the plurality of callees; and
   wherein the iteratively attempting is performed by the server.

3. The method of claim 2, further comprising:
   identifying, at the client device of the caller, the respective contact member according to a manual user input, wherein the set-of-rules is mapped to the respective contact member at the client device.

4. The method of claim 2, wherein the server attempts to establish the communication session as a voice over internet protocol (VoIP) phone call.

5. The method of claim 1, wherein detecting failure comprises a failure to acquire a real time human response.

6. The method of claim 1, wherein the set-of-rules dynamically define the callee for the subsequent attempt at establishment of the communication session based on at least one of a fact acquired by code and sensor input data.

7. The method of claim 6, wherein the set-of-rules dynamically define the callee based on at least one member from the group consisting of: time of day, geographic location of the caller, geographic location of the callee, topic of discussion, frequency of earlier communication sessions between the caller and the callee, and previous communication sessions initiated from the callee.

8. The method of claim 1, wherein the set-of-rules define additional communication addresses of the same respective contact for subsequent communication session establishment attempts.

9. The method of claim 1, wherein the set-of-rules associated with the respective contact member define different communication addresses of other contact members different than the respective contact member for subsequent communication session establishment attempts.

10. The method of claim 1, further comprising repeating the sequence from a beginning when a last of the communication session establishment attempts has failed.

11. The method of claim 1, wherein a last entry in the sequence defines an electronic message for transmission to the client device of the contact member using an electronic message address stored in associated with the contact member in the electronic address-book.

12. The method of claim 1, further comprising terminating the iteratively attempting to establish further communication sessions and establishing a communication session with a simultaneous incoming communication session attempt, when the simultaneous incoming communication session attempt is detected as originating from at least one of an originating contact member and an originating communicating address defined within the set-of-rules being applied.

13. The method of claim 1, further comprising continuing the iteratively attempting until a human communication is established with any of the previous callees.

14. The method of claim 1, further comprising automatically analyzing the attempted sequence, and automatically adapting to set-of-rules according to the analysis to attempt to reduce the number of future failed attempts.

15. A server for establishing communication sessions each between a caller client device and a callee client device, comprising:
   a first communication interface for communicating with a plurality of caller client devices;
   a second communication interface for establishing a communication session with each of a plurality of callee client devices;
   a program store storing code;
   a processor coupled to the first communication interface, the second communication interface, and the program store for implementing the stored code, the code comprising:
   code to receive from each of the plurality of caller client devices, an electronic message including a set-of-rules associated with a callee, the set of-rules defining a sequence of at least one iterative attempts at establishing a communication session;
   code to iteratively apply the set-of-rules to iteratively attempt to establish a subsequent communication session when an attempt to establish a communication session via the second communication interface using a communication address of a callee client device of one of the plurality of the callees fails, wherein each respective iterative attempt includes attempting to establishing further communication sessions defined by the sequence when previous attempts at establishing communication sessions have failed; and
   code to route the established communication session via the first communication interface to the respective caller client device, to allow communication between the caller client device and the callee client device;
   wherein each respective communication session allows human language based communication between the caller and the callee.

16. The server of claim 15, wherein computing resources of each respective caller client device are freed up for other uses when the server receives the electronic message from the respective caller client device.

17. The server of claim 15, wherein the sequence of at least one subsequent attempt includes at least one second communication address of the respective callee client device or a second callee, and the code applies the set-of-rules to attempt to establish the subsequent communication session to the at least one second communication address of the respective callee client device or the second callee.

18. The server of claim 15, wherein the first communication session is a voice over internet protocol (VoIP) phone call, and the communication address is a phone number.

19. The server of claim 15, wherein the communication session is established when the code identifies a ring tone, and the communication session fails when the code identifies a member of the group consisting of: a busy signal, a signal representing the callee being on another line, a signal representing the callee device is off, a signal representing the callee device is unavailable, and a signal representing a forward to voicemail.

20. The server of claim 17, wherein the subsequent communication session is an electronic messaging session, and the second communication address is an electronic messaging address.

21. The server of claim 15, wherein the code store includes code to:
automatically generate the set-of-rules by analyzing at least one of social relations from a social network, a family tree, and patterns in a history of actually dialed numbers.

22. The server of claim 15, wherein the sequence of at least one subsequent attempt includes a plurality of second communication addresses of a plurality of second contact members, and the code applies the set-of-rules to simultaneously attempt a single subsequent communication session including the plurality of second contact members via the plurality of second communication addresses.

23. The server of claim 15, further including a set-of-rules repository storing a plurality of second sets-of-rules each associated with a communication address of a callee client device, wherein the code executes the respective second set-of-rules corresponding to respective communication addresses of the respective callee client device defined by the set-of-rules within the electronic message.

24. A client device of a caller for establishing a communication session with a callee client device, comprising:
a communication interface for establishing at least one communication session with at least one client device of at least one callee;
an electronic address-book storing a plurality of contact members with at least one related communication address for establishment of the at least one communication session;
a set-of-rules repository storing, for at least one of the plurality of contact members, at least one set of-rules defining a sequence of at least one subsequent attempts at establishing a communication session;
a program store storing code;
a processor coupled to the communication interface, the electronic address-book, and the set-of-rules repository, and the program store for implementing the stored code, the code comprising:
code to iteratively apply the set-of-rules associated with a respective contact member of a plurality of callees of the electronic address-book to iteratively attempt to establish a subsequent communication session when an attempt to establish a communication session via the communication interface using a communication address of a client device of the respective contact member fails, wherein each respective iterative attempt includes attempting to establishing further communication sessions defined by the sequence when previous attempts at establishing communication sessions have failed;
wherein each respective communication session allows human language based communication between the caller and the callee.

25. The client device of claim 24, wherein the sequence of at least one subsequent attempt includes at least one second communication address of the respective contact member or a second callee, and the code applies the set-of-rules to attempt to establish the subsequent communication session to the at least one second communication address of the client device of the respective contact member or the second callee.

26. The client device of claim 25, wherein the second callee is a second contact member stored within the electronic address-book, and the set-of-rules includes a map to the second contact member stored within the electronic address-book to access the at least one second communication address.

27. The client device of claim 25, wherein the second communication address of the second callee is stored as data in association with the entry of the respective contact member in the electronic address-book.

28. The client device of claim 24, wherein the code to apply the set-of-rules executes in a background of the client device, and simultaneously a different application executes simultaneously in a foreground of the client device.

29. The client device of claim 24, wherein the code attempts to simultaneously establish a plurality of subsequent communication sessions using different communication mediums by respectively executing different communication applications.

30. The client device of claim 24, further comprising code to at least one of automatically generate and automatically update the set-of-rules of the respective contact member by learning manual user actions when establishment of the first communication session fails.

\* \* \* \* \*